United States Patent [19]

Gely et al.

[11] Patent Number: 4,712,980

[45] Date of Patent: Dec. 15, 1987

[54] FAIRING FOR TURBO-JET ENGINE FAN LEADING EDGE

[75] Inventors: Jean-Marie L. Gely, Le Havre; Marius J. Goutines, Melun; Geordes Meauzé, Paris, all of France

[73] Assignee: Societe Nationale d'Etude et de Construction de Moteurs d'Aviation "S.N.E.C.M.A.", Paris, France

[21] Appl. No.: 860,864

[22] Filed: May 8, 1986

[30] Foreign Application Priority Data

May 9, 1985 [FR] France .................. 85 06996

[51] Int. Cl.$^4$ ............................................. F01D 5/16
[52] U.S. Cl. .................. 416/224; 415/DIG. 1; 416/228
[58] Field of Search ............... 416/224, 228 R, 228 A; 415/119, 181, DIG. 1

[56] References Cited

U.S. PATENT DOCUMENTS

| | | | |
|---|---|---|---|
| 1,862,827 | 6/1932 | Parsons et al. | 416/224 X |
| 3,365,126 | 1/1986 | Stoffer et al. | 416/224 X |
| 3,694,104 | 9/1972 | Erwin | 416/217 |
| 3,844,677 | 10/1974 | Evans et al. | 416/228 X |
| 3,999,888 | 12/1976 | Zincone | 416/224 X |
| 4,051,289 | 9/1977 | Adamson | 416/224 X |
| 4,097,193 | 6/1978 | Brunsch et al. | 416/224 |
| 4,111,600 | 9/1978 | Rothman et al. | 416/2 |
| 4,318,672 | 3/1982 | Hansen | 416/224 |

FOREIGN PATENT DOCUMENTS

| | | | |
|---|---|---|---|
| 1566 | of 1926 | Australia | 416/228 |
| 1161912 | 1/1964 | Fed. Rep. of Germany . | |
| 10807 | 1/1979 | Japan | 416/224 |
| 360230 | 11/1931 | United Kingdom . | |
| 789883 | 1/1958 | United Kingdom . | |

*Primary Examiner*—Robert E. Garrett
*Assistant Examiner*—Joseph M. Pitko
*Attorney, Agent, or Firm*—Oblon, Fisher, Spivak, McClelland & Maier

[57] ABSTRACT

A fairing formed from a dihedron of which the faces, disposed in the extension of the intrados and extrados surfaces follow the aerodynamic profile of the blade. Such rejoin the blade at a small radius portion constituting a leading edge. The fairing imparts a characteristic enabling the optimum efficiency of the fan to be approached. The useful height of the dihedron is at least 5% of the height of the blade.

10 Claims, 5 Drawing Figures

FAIRING FOR TURBO-JET ENGINE FAN LEADING EDGE

BACKGROUND OF THE INVENTION

1. Field of the Invention

The invention relates to a fairing for the leading edge of fan blading of a turbo jet engine.

2. Summary of the Prior Art

For certain turbo jet engines, the tips of fan blades are subjected to supersonic flow, of the order, for example of Mach 1.5. In order to conform to the regulations, and directions of Certification Authorities with regard to material capable of resisting the bird impact, the thickness of the leading edge of the blades has been exaggerated on the basis of the sole consideration of the strength of the materials and the optimization of the aerodynamic efficiency of the stage.

The excessive thickening of the leading edge gives rise to the creation of a detached shock wave system which results in extended localized subsonic zones and which reduces the efficiency of the compression stage.

The flow of air which enters into the duct "sees" the periodic shock wave system, which results in an amplification effect responsible for appreciable loss in efficiency over the whole of the stage. This effect is more important, in the case of fans with a peripheral heel or platform, employed in certain engines, because of the additional thickening necessitated by the connection of the leading edge to the heel or platform. The platforms together form a peripheral shroud.

Tests and calculations have shown that the generation of losses can be expressed as curves as a function of the Mach number which have an exponential tendency, and it has been estimated that 20% of the total losses of the blading arise for this reason. This part of the losses being is attributable solely to the thickening of the leading edge. According to aerodynamic flow theory these losses result from the detachment of the shock waves at an inclination to the leading edges.

The solution will consist in thinning down the profile of the leading edge, at least at the head of the blade, so as to create inclined shocks without modifying the relative flow which remains supersonic. U.S. Pat. No. 1,862,827 teaches members connected to the leading edges of steam turbine blades which have as their objective the avoidance of erosion resultant from impact produced by water droplets. They have, in the sense of rotation, projections of which the surfaces encounter the droplets at angles which are sufficiently small to avoid the formation of holes under repeated impact action.

Other members, described in U.S. Pat. No. 3,365,126, comprise points on their outer edges, which tightly cover the leading edge of the compressor blades or of the fan of an aircraft engine. Their objective, identical to that of the patent referred to above, is to avoid erosion caused by water drops, ice or dust, as well as to maintain and even to improve the aerodynamic efficiency.

SUMMARY OF THE INVENTION

The objective of the present invention is to improve the aerodynamic efficiency of the blades at a thick leading edge by the addition of, on at least a part of the tip of the blade, a fairing extending the leading edge and forming a new edge having a form and dimensions compatible with achieving optimum aerodynamic efficiency.

According to the present invention there is provided fairing for the leading edge of a fan blade of a turbo-jet engine comprising means defining a dihedron of which the faces lie in respective extensions of the surfaces of the intrados and of the extrados of the blade and follow the aerodynamic profile of the blade, the two faces joining at a rounded portion of small radius constituting a leading edge approaching optimum efficiency of the fan.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
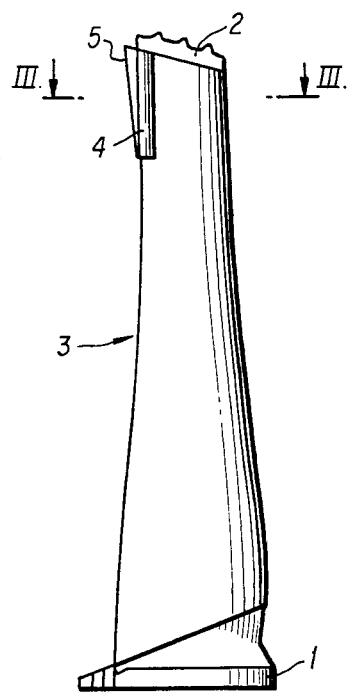
FIG. 1 is a side elevational view of a blade with a peripheral heel or shroud portion equipped with a device in accordance with the invention.

FIG. 1 illustrates a turbo jet engine one-piece forged-type fan blade comprising a root 1 for securing to the fan rotor of the compression stage and a peripheral heel, platform or shroud portion 2 providing a connection between the array of blades of the rotor and thus fluid-tightness with a sealing ring provided on the casing of the fan. The platforms thus, together, form a shroud.

The blade has at its end radial and on its leading edge 3, a fairing 4 in accordance with one embodiment of the present invention. This fairing aims artificially to thin down the profile of the leading edge in order to obtain an improved efficiency for the stage and indeed to approach optimum efficiency.

Figure 3:
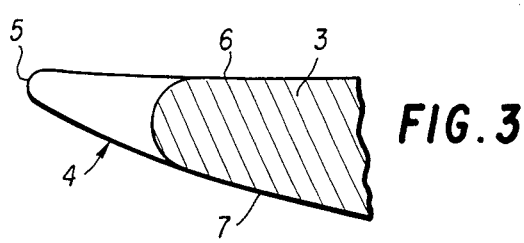
FIG. 3 is a fragmentary sectional view taken on line III—III of FIGS. 1 and 2.

The fairing 4 has the form substantially of a dihedron (FIG. 3) of which the faces, lie in the extension of the intrados 6 and of the extrados 7 and follow the aerodynamic profile of the blade. The faces join at a rounded portion of small radius forming the apex 5 of the dihedron.

The useful height of the dihedron, that is to say the minimum height enabling achievement of a substantial improvement in efficiency, is of the order of 15% of the height of the blade for the application described. In certain types of fan blades, 5% of the height of the blade will be sufficient.

According to the embodiment illustrated in FIG. 1 the faces of the dihedron have, in projection, the approximate shape of a rectangular trapezium of which the smaller base is directed towards the root of the blade. The thickness of the leading edge of the dihedron thus increases until it reverts to the thickness of the leading edge of the blade in order to form a continuous surface between the blade and the fairing.

Figure 4:
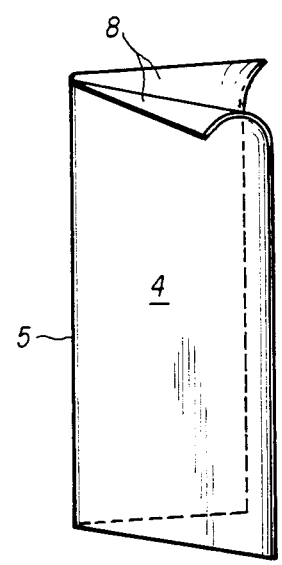
FIG. 4 is a perspective view of one embodiment of the fairing.

The dihedron may be provided at its upper part adjacent to the platform 2 with a fold 8 (FIG. 4) enabling connection of the faces of the dihedron to the platform.

Figure 2:
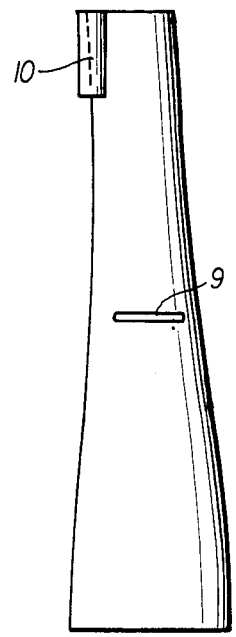
FIG. 2 is a side elevational view of a blade with fins provided with a device in accordance with the invention.

FIG. 2 illustrates a blade with an intermediate fin 9 provided at its end with a fairing 10 formed by a dihedron of which the faces have, in projection, a rectangular shape. The rounded apex of the dihedron, forming the thinned down leading edge, is not connected at its radially inner edge (i.e. towards the root of the blade) to the leading edge of the blade but forms a discontinuity.

The fairings are made for example, from a sheet material, metallic or otherwise, cut and folded to the desired dimensions, secured in known manner at the front of the leading edge of the surfaces of the blade. Securement effected according to the material used by brazing, adhesive or other known means.

Figure 3A:
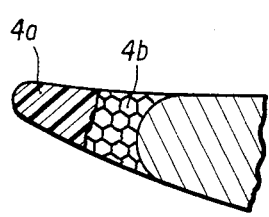
FIG. 3a is an analogous view of FIG. 3 in another embodiment.

The sheet material constitutes a skin which can be internally reinforced by filling with an organic foam 4a, having a honeycomb structure 4b or otherwise, as shown respectively in FIG. 3a.

The fairings may be manufactured by moulding of a homogeneous material (for example a synthetic resin) then adhered to the leading edge of the blade or by direct moulding on to the leading edge. These two manufacturing methods may provide a skin formed by a metallic coating or otherwise.

The advantages which arise from the use of fairings according to the invention are as follows:

1. Appreciable increase in efficiency;
2. Ability to use on existing blades;
3. Low cost;
4. Maintenance of the strength of the blade and of its own frequency and minimization of unbalance, resulting from possible loss of the fairings, because of the low weight of the latter;
5. Detachable character of the fairing facilitates maintenance and development; and
6. Reduction in the amplitude of the noise of the fan associated with shock waves, during take off and thrust reduction phases.

Obviously, numerous modifications and variations of the present invention are possible in light of the above teachings. It is therefore to be understood that within the scope of the appended claims, the invention may be practiced otherwise than as specifically described herein.

What is claimed is:

1. A fairing for the leading edge of a one-piece, forged-type fan blade of a turbo jet engine comprising: means defining a dihedron formed with a rigid skin and secured to the front of the leading edge of a radial end portion of the blade on the surfaces of the intrados and extrados and with faces which lie in respective extensions of the surfaces of the intrados and of the extrados of the blade and follow the aerodynamic profile of the blade, the surfaces joining at a rounded portion of small radius constituting a leading edge enabling an optimum efficiency of the fan.

2. A fairing according to claim 1, wherein the useful height of the dihedron is at least 5% of the height of the blade.

3. Fairing according to claim 1 wherein the dihedron is formed with a skin and is secured to the front of the leading edge of the blade on the surfaces of the intrados and of the extrados.

4. A fairing according to claim 3, wherein the skin is internally reinforced by a homogeneous material.

5. A fairing according to claim 3, wherein the skin is reinforced by a honeycomb structure.

6. A fairing according to claim 1, wherein the dihedron is formed by moulding a homogeneous material.

7. A fairing according to claim 1, wherein the dihedron is formed of a metallic sheet material.

8. A fairing according to claim 1, wherein the thickness of the leading edge of the dihedron increases towards the root of the blade until it corresponds to the thickness of the leading edge of the blade.

9. A fairing according to claim 8, intended for use with a blade having a peripheral platform wherein the dihedron supports at its upper part adjacent to the platform a fold connecting it to the platform of the blade.

10. An aircraft engine fan blade having a leading edge and a radially-outer tip portion wherein a fairing is secured to said leading edge at said tip portion, said fairing comprising:
   a skin portion forming an extension of the intrados of the blade,
   a skin portion forming an extension of the extrados of the blade,
   a rounded apex portion interconnecting the skin portion at a zone remote from the leading edge of the blade, said apex portion having a radius of curvature less than that of the leading edge portion of the blades, and
   reinforcement means located within said skin portions of the fairing.

* * * * *